United States Patent [19]

Bajcar et al.

[11] 3,908,537

[45] Sept. 30, 1975

[54] VACUUMIZING APPARATUS

[75] Inventors: Miles S. Bajcar, Palos Hills; Robert H. Marshall, Hinsdale; William M. Allen, Indian Head Park, all of Ill.

[73] Assignee: Chemetron Corporation, Chicago, Ill.

[22] Filed: Oct. 9, 1974

[21] Appl. No.: 513,205

[52] U.S. Cl. .................................. 99/472; 99/472
[51] Int. Cl.² ....................................... A22C 17/00
[58] Field of Search ....... 99/471, 472, 189; 426/486

[56] References Cited
UNITED STATES PATENTS
3,559,556  8/1971  Madsen.............................. 99/472

*Primary Examiner*—Peter Feldman
*Assistant Examiner*—Alan Cantor
*Attorney, Agent, or Firm*—N. M. Esser

[57] ABSTRACT

An apparatus for removing air from meat emulsions or the like. The apparatus, which can be quickly disassembled for clean up purposes, includes a vacuum chamber having an annular, downwardly diverging wall which is mounted upon a transversely positioned, rectangular pumping chamber. The rectangular chamber fills with meat at a faster rate than a circular chamber of comparable size, and, in conjunction with the diverging wall, alleviates the tendency of the meat to form a bridge above the piston of the pumping chamber.

10 Claims, 8 Drawing Figures

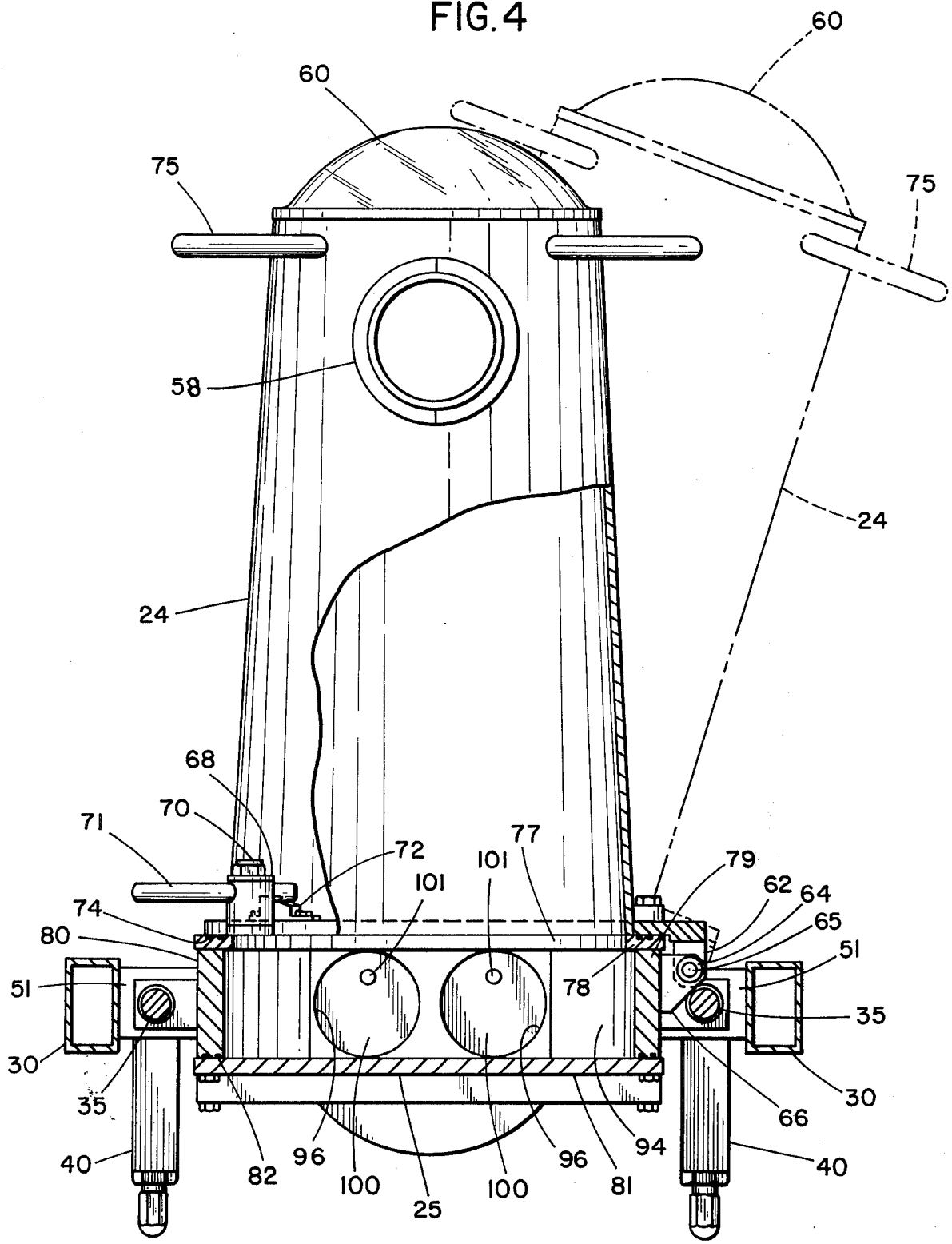

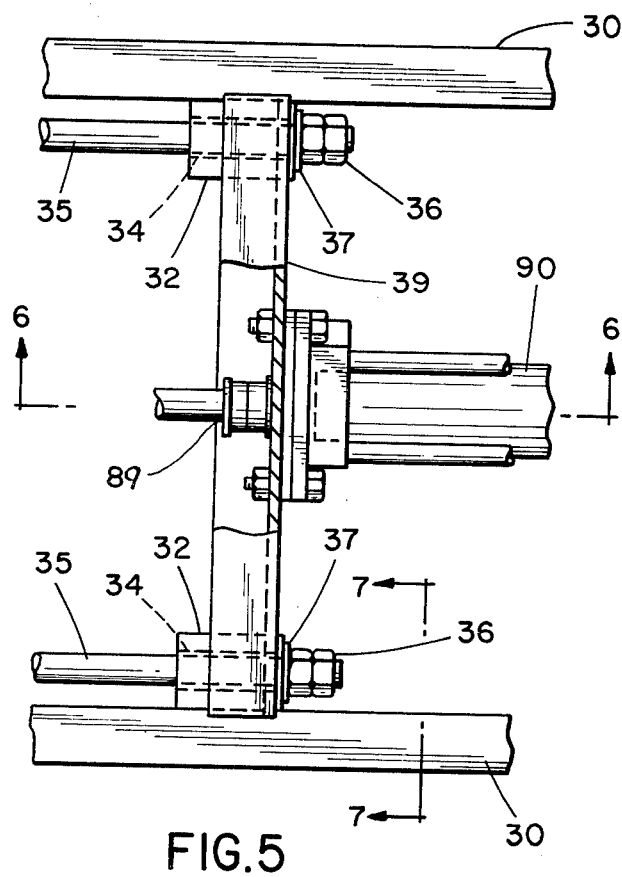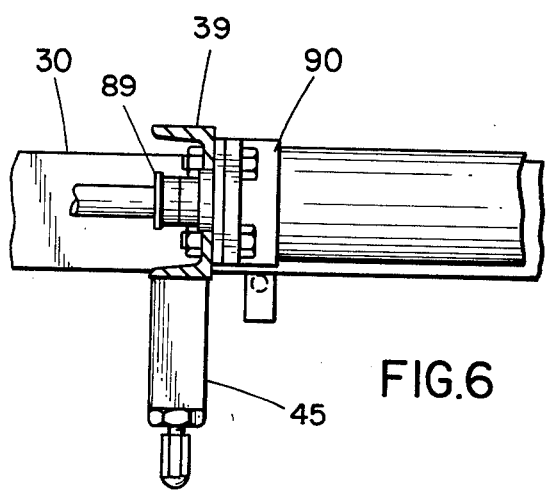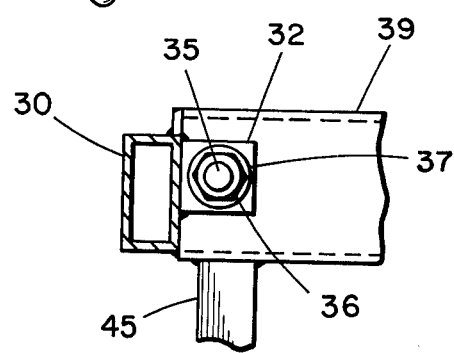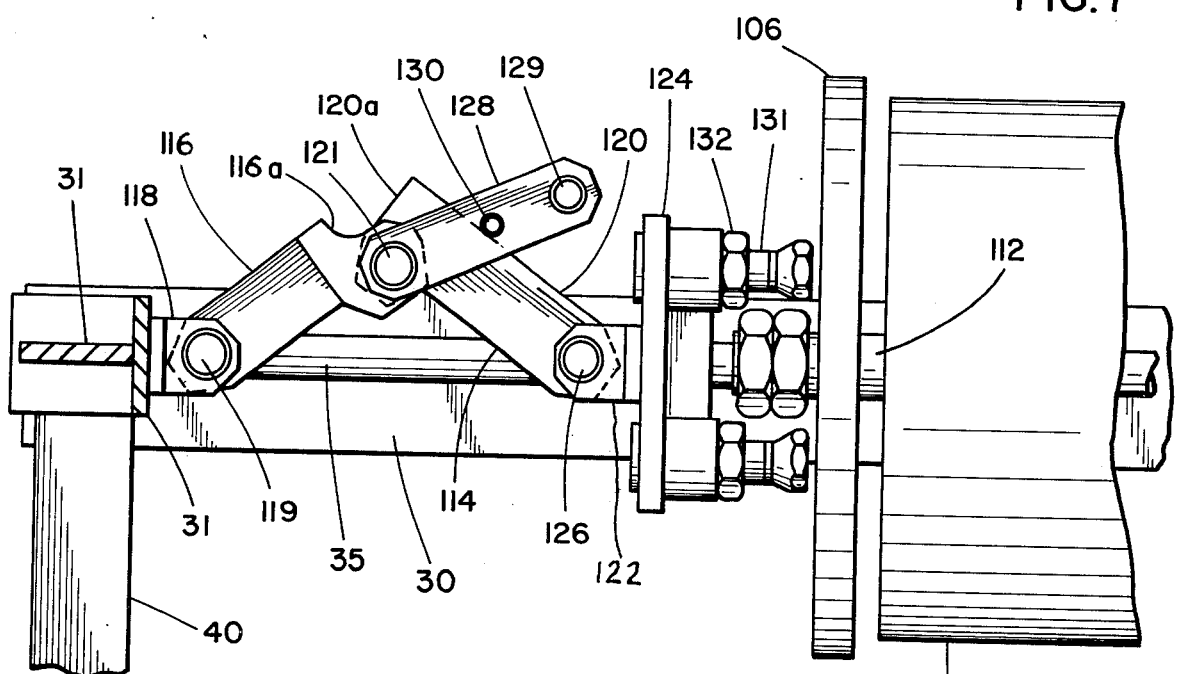

VACUUMIZING APPARATUS

BACKGROUND OF THE INVENTION

1. Field of the Invention

This invention pertains to vacuumizing apparatuses for food products.

2. Description of the Prior Art

A conventional vacuumizing apparatus utilizes a vacuum chamber that has a cylindrical top portion with an inwardly converging configuration adapted to merge with the open top of a lower, transversely mounted, cylindrical pumping chamber. The cylindrical pumping chamber is commonly used due to its low cost and sealing efficiency. Generally associated with the vacuum chamber is a hopper for storing the food product, which may be a meat emulsion, and which is transferred by the draw of the vacuum in the chamber, aided by atmospheric pressure in the hopper, through a conduit from the bottom of the hopper to the top of the chamber where it falls by gravity into the pumping chamber below, with the air entrained therein being removed upwardly in the process. A metering valve is usually incorporated within the line to regulate the flow of the meat to the vacuum chamber. By use of a reciprocatable piston, the vacuumized meat is pumped from the vacuum chamber against a suitable check valve, to prevent return of meat as the piston retracts, until a desired amount is deposited in a stuffer, wherein a stuffer piston ejects same to outlet tubes. The tubes may be equipped with stuffing cocks and may be used to fill meat casings therefrom. The apparatus can be operated in a manual, semi-automatic or automatic manner, depending upon the mechanisms utilized. A problem with the conventional vacuumizing apparatus has been the movement of the vacuumized meat emulsion. Since the product is quite "tacky" and thus viscous, it is frequently chilled for better preservation. Although chilling same is advantageous, it often causes the meat to get still more "tacky" and difficult to handle. As a consequence, a "bridge or arch" above the circular piston frequently builds up and the meat will not fall readily into the pumping chamber to be pumped, necessitating apparatus disassembly or other remedial action. Also the circular chamber, under the best of circumstances, takes a relatively long time to fill because of the drop zone height, hence the pumping rate is rather low.

SUMMARY OF THE INVENTION

Applicants have designed a vacuumizing apparatus that is intended to alleviate the disadvantages of the prior art. Specifically, Applicants have designed a preferably rectangular pumping chamber and associated piston in conjunction with a vacuum chamber having an annular, downwardly diverging wall designed to fit over the top of the transversely mounted pumping chamber. Since the meat has a shorter distance to fall, the rectangular chamber fills more quickly for a faster pumping rate than the comparable circular chamber. Further, the material, primarily due to the downwardly diverging wall, has a much less tendency to "bridge" over the moving piston (because it falls away downwardly from the wall) and hence slow down the pumping rate. Due to the nature of the product pumped, any ineffective pumping action that has a tendency to excessively "work" the product, undesirably changes its texture. Applicants have also included in their design the necessary quick clean up features for an apparatus of this nature.

It is, therefore, an object of this invention to provide a new and improved vacuumizing apparatus.

Another object of this invention is to provide a vacuumizing apparatus that operates at a higher rate of efficiency.

Another object of this invention is to provide a vacuumizing apparatus that is easily disassembled for clean up purposes. Another object of this invention is to provide a vacuumizing apparatus that prevents excessive working of the product.

BRIEF DESCRIPTION OF THE DRAWINGS

FIG. 4 is a partial sectional view taken along line 4—4 of FIG. 1;

FIG. 5 is a plan view, partially cut away, taken along line 5—5 of FIG. 1;

FIG. 6 is a sectional view taken along line 6—6 of FIG. 5;

FIG. 7 is a sectional view taken along line 7—7 of FIG. 5; and

FIG. 8 is a elevational view similar to FIG. 1 with the main pressure latch in the collapsed position.

DESCRIPTION OF THE PREFERRED EMBODIMENT

Figure 1:
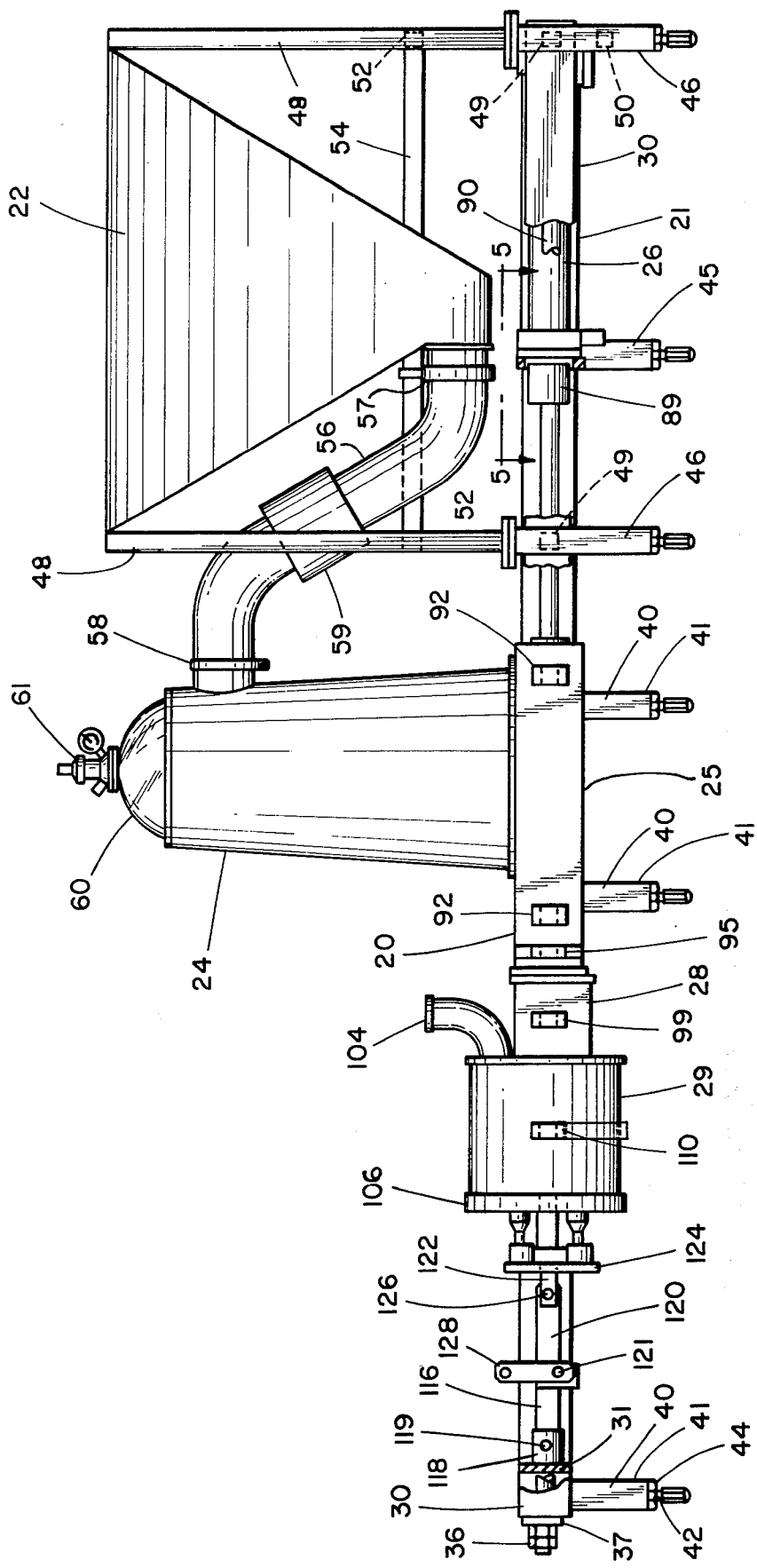
FIG. 1 is a partly diagrammatical and elevational view with portions cut away of the vacuumizing apparatus of this invention.

Referring to FIG. 1, 20 indicates a vacuumizing apparatus. Apparatus 20 includes a base assembly 21, a hopper 22, a vacuum chamber 24, a pumping chamber 25, a pumping assembly 26, a check valve assembly 28 and a stuffer 29.

Base assembly 21, as shown best in FIGS. 1, 2, 4, 5, 6, and 7, includes rectangular structural members 30 which extend the length of the apparatus. Connecting the members 30 at the end opposite hopper 22 are support members 31 welded to blocks 32 which are in turn welded to members 30. Blocks 32 have suitable holes therethrough which contain bushings 34 which mount tension and cleanup rods 35. Rods 35 extend a substantial length of the apparatus and are rigidly mounted thereon by suitable hex nuts 36 and washers 37 in conjunction with blocks 32. As shown in FIGS. 5, 6, and 7 members 30 are connected by welding to base portion (which may be a channel) 39. Channel 39 also has openings for the noted blocks 32 extending therethrough and which also are welded thereto. Bushings 34 support rods 35 as at the other end of the base. Hex nuts 36 and 37 also complete the removable mounting of the rods 35 on the channel end of the base assembly.

Also a part of the base assembly 21 are legs 40 which consist of tubing sections 41 welded to the underside of blocks 32. Tubing 41 has a threaded insert welded therein which is engaged by threaded adjustable leg 42. Hex nut 44 maintains the desired length of leg 42. Similarly legs 45 attached to channel 39 and legs 46 which support hopper 22 have adjustable construction to allow the level positioning of the apparatus. Legs 46 are outboard of the rest of the apparatus and are generally in line with square tubing portions 48 which support the hopper 22. Tubing 49 extends between legs 46 to member 30 to support same. Also cross member 50 connects legs 46 at the end of the base assembly. Corresponding to blocks 32 are centering blocks 51 which are also welded to members 30 and have the bushing construction of blocks 32. The purpose of blocks 51 will be detailed later in the specification.

Figure 3:
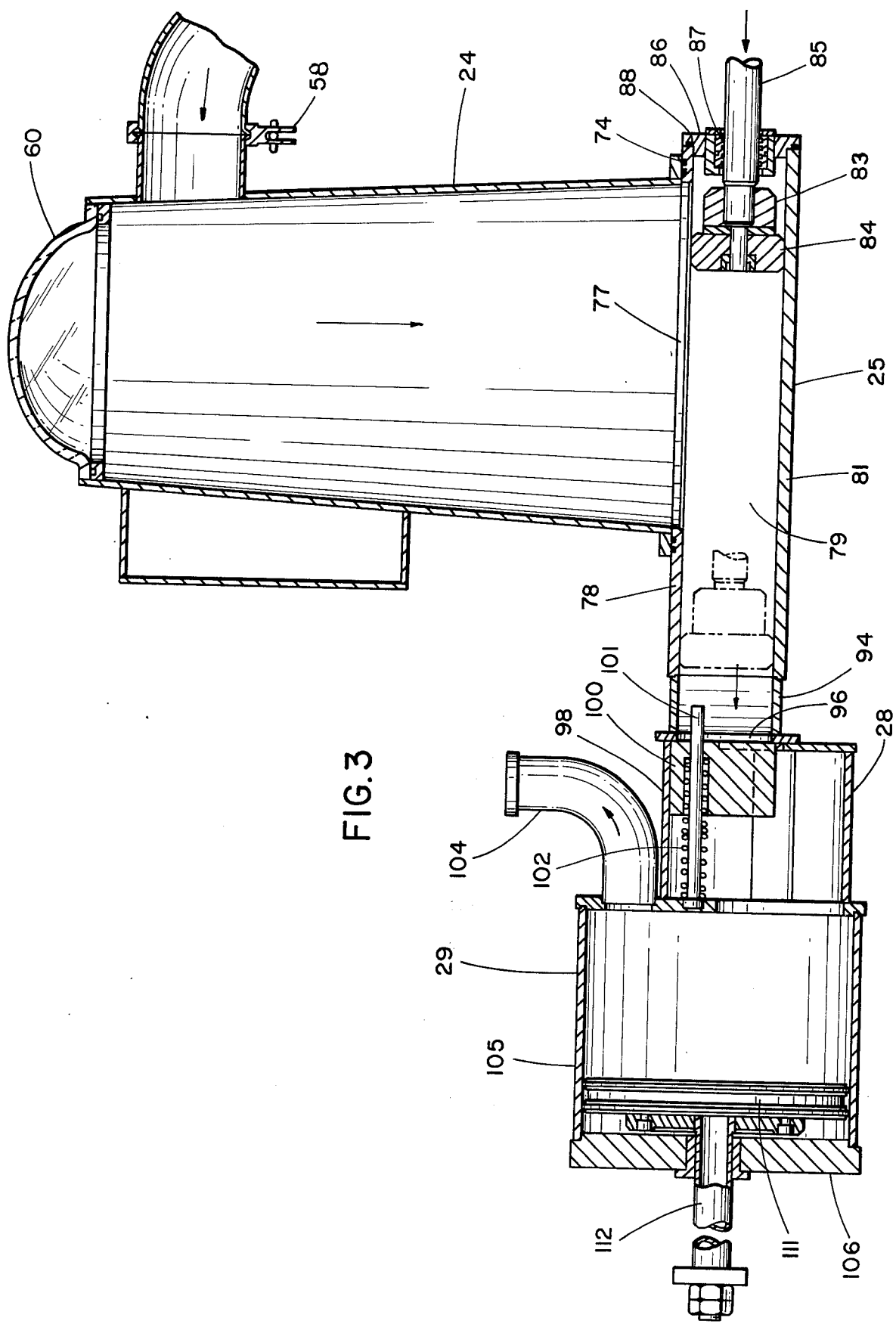
FIG. 3 is an elevational view of the apparatus taken along line 3—3 of FIG. 2.

Hopper assembly 22 as shown best in FIGS. 1 and 3 has a conventional tapered configuration formed from sheet material and is supported primarily by tubing portions 48. Supporting members 52 and 54 provide reinforcement. Although, not shown, the hopper assembly could be movably mounted on legs 46 to provide a height adjustment. Hopper assembly 22 has a circular opening formed by a flange having a tapered surface. The flange is constructed to be tightened to a complementary flange of a conduit 56 by a conventional V-type toggle link clamp 57 to provide quick disassembly for clean up purposes. Conduit 56 extends upwardly and has a flange that complements a flange forming a part of vacuum chamber 24. V-type toggle link clamp 58 connects the flange of the conduit and the chamber similarly as clamp 57. Located in conduit 56 between the clamps is a flow control valve 59 which is shown diagrammatically. Valve 59 may be a manually operated flapper type valve or a pneumatically operated sleeve valve which is constricted by air pressure to control flow.

Connected to conduit 56 is vacuum chamber 24. Chamber 24 as shown best in FIGS. 1, 2, 3, and 4 has a plastic cover 60 which is transparent and can be used by the operator to check the movement of the meat emulsion into the chamber. Cover 60 has a fitting 61 which is adapted to be connected to a source of vacuum, and which includes a bleed fitting and a vacuum gauge. Normally a range of 27.5 to 30 inches HG is maintained in the chamber. Cover 60 is maintained on chamber 24 by the vacuum therein. Chamber 24 is constructed in the form of a frustrum of a cone with an annular downwardly diverging wall. It has a lower portion (see FIG. 4) welded to the cone having a pair of spaced ears 62, bushings 64 therefor and a pin 65 and suitable retaining rings. Chamber 24 is adapted to be pivoted, as shown in FIG. 4, about pin 65 which also extends through suitable bushing equipped ears 66 extending from pumping chambers 25, for clean up purposes. Attaching chamber 24 to pumping chamber 25 during vacuumizing, are clamps 68 (each of which consist of post 70, handle 71 and a retainer) attached to the top of pumping chamber 25. Latch inclines 72 mounted on the lower plate of chamber 24 allow clamps 68 to tightly secure chamber 24 to pumping chamber 25 against seal rings 74. Handles 75 aid in moving chamber 24 to the pivoted position.

Referring to FIGS. 1, 2, 3, and 4, pumping chamber 25 is shown in varying degrees of detail. FIG. 4 in particular shows the rectangular configuration of the chamber. Chamber 25 has an opening 77 in its top portion which is aligned with the opening in the lower portion of vacuum chamber 24 for the movement of the product by gravity into the pumping chamber. Chamber 25 consists of top wall 78, side walls, 79 and 80, and bottom wall 81. Inasmuch as high pressure are developed in the chamber, close machining tolerances for the parts must be held and a plurality of tension bolts used, increasing in number toward the high pressure end of the chamber 25. As shown in FIG. 4, solder is applied in typical grooves 82 and with the addition of heat caused to flow between the surfaces to form a seal adequate for the pressure encountered in the chamber and to eliminate crevices to meet sanitary requirements. Mounted in chamber 25 for reciprocation therein is piston 84 as shown best in FIG. 3. Piston 84 is also rectangular in configuration and is movable between the limits shown. Piston 84 includes extension rod 85 mounted in piston backing plate 83. Rod 85 extends out of chamber 25 through a sealed opening 87 in rear plate 86 which has a seal ring 88 to seal same against the rear of the pumping chamber. Plate 86 has bushings 89 in its ends for mounting on rods 35. Suitable clamps (not shown) maintain rear plate 86 to pumping chamber 25 at the low pressure end of chamber 25 during use.

Attached to extension rod 85, which can easily be dismantled from piston 84 is coupling 89. Coupling 89 is constructed to join rod 85 to the piston rod of hydraulic double acting cylinder 90. Cylinder 90 has one end mounted on a suitable pad or support member 50 by suitable capscrews. The forward end of cylinder 90 as shown in FIG. 6 is attached by means of a flange to channel 39 by suitable bolts and nuts. It is to be noted at this point that as shown in FIG. 7, channel 39 is welded to members 30 only along its ends — primarily to position channel 39. Inasmuch as the major reactive force exerted on the piston of cylinder 90 due to its mounting arrangement is transferred to channel 39, it is clear that the noted welded structure would not be adequate. Since rods 35 are rigidly mounted on base assembly 21 inward of the channel ends and at both ends by nuts 36, channel 39, when loaded, will transfer the load to rods 35 placing same under tension. This tension load will thus be distributed to structural members 30 of base 21 rather than concentrated at the welded area joining channel 39 and members 30. Also to be noted at this time is that chamber 25 is supported on rods 35 extending between bushings in centering blocks 51 and also extending through openings in bosses 92 on pumping chamber 25. Chamber 25 due to its positioning between centering blocks 51 is restrained from movement.

Referring to FIGS. 1, 2, 3, and 4, the high pressure portion of the pumping chamber 25 is disclosed along with its adjoining members. Check valve converger assembly 94 is mounted adjacent to open end of pumping chamber 25. Assembly 94 has a pair of openings on its lug ends 95 having suitable bushings for slidably mounting same on rods 35. Primarily assembly 94 has a tapering opening away from chamber 25 to guide the food into two openings 96 aligned with check valves in check valve assembly 28. In each end wall of assembly 94 is sealing means for sealingly engaging pumping chamber 25 and check valve assembly 28 when the assemblies are pressed tightly together.

Located adjacent assembly 94 is check valve assembly 28. Assembly 28 also has lug ends 99 equipped with bushings for mounting same on rods 35. Also located in assembly 28 (see FIG. 3) are two check valves 100 mounted on pins 101 with springs 102 which bias the valves to a normally closed position. A part of assembly 98 are two elbows 104 which are adapted to remove food from the later to be described stuffer 29 to tubing which may have stuffing cocks for filling meat casings.

Stuffer 29 is mounted immediately adjacent valve assembly 28. Stuffer 29 includes a barrel housing 105, and an end plate 106. Plate 106 has lugs 107 with holes and bushings therein for movement of plate 106 on rods 35. Also mounted under barrel 105 is cradle 109 which also has lugs 110 and bushings for slidable movement on rods 35. Piston 111 mounted on piston rod 112 is located in barrel 105 and is adapted to be actuated by any suitable source to pump the meat out the stuffer via elbows 104.

Main pressure latch assembly 114 (which is of the toggle link variety) is adapted to move all of the assemblies that are slidably mounted on rods 35 tightly together against the pumping chamber for the operative position of the vacuumizer. It is to be noted that the centering blocks prevent movement of the pumping chamber 24. The rear plate 86 of the pumping chamber is secured thereto by the noted clamps and is not affected by latch assembly 114.

Figure 2:
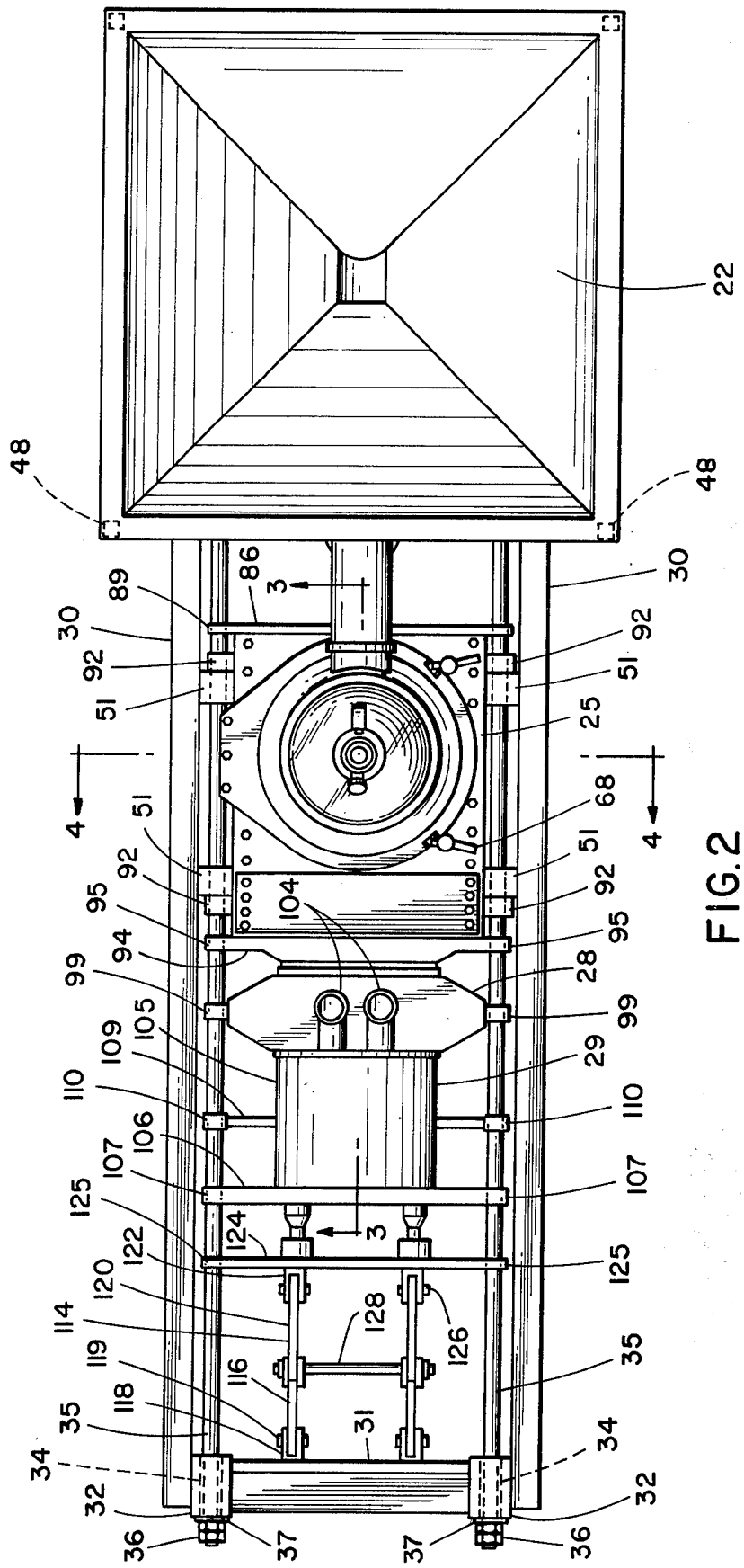
FIG. 2 is a plan view of the vacuumizing apparatus.

Latch assembly 114, as best shown in FIGS. 2 and 8, consists of pivot links 116 which are attached to support member 31 of base assembly 21 by clevises 118 secured to 31 by suitable washers and capscrews. Pins 119 and suitable retaining rings pivotally connect links 116 to clevises 118. Pivot links 120 are pivotally connected to pivot links 116 by pins 121 and suitable retaining rings. Links 120 have stop surfaces 120a and links 116 have surfaces 116a which hold the links in the horizontal locked position. Pivot links 120 are also pivotally mounted on clevises 122, which are welded to pressure plate 124, by pins 126 and retaining rings. Pressure plate 124 has bushing equipped openings in lugs 125 for movement on rods 35. For movement of latch assembly 114, included is swing handle 128 which is connected to the assembly by pins 121. Handle 128 has a grip portion 129 adapted to be handled by the operator. Rods 130 of swing handle 128, position handle 128 when not in use. Although not shown, a slidable dead bolt type or equivalent latch extending between links 116 and 120 with suitable locking positions may be provided to prevent inadvertent movement of latch assembly 114 from the operative position. Attached to pressure plate 124 are a plurality of pressure studs 131 and nuts 132 by which the studs are adjustably held in position against end plate 106.

In operation, the operator grasps handle portion 129 of latch assembly 114, it same is in the position shown in FIG. 8, and moves the handle and therefore links 116 and 120 downward past an over center position. This forces pressure plate 124 to move on rods 35 until studs 131 contact end plate 106. End plate 106 is then forced against barrel 105 which by virtue of cradle 109 moves against check valve assembly 28 which in turn forces converging assembly 94 against the adjacent end of pumping chamber 25. Since the rear plate 86 of the chamber has been fastened thereto by appropriate clamps, the vacuumizer apparatus is now ready for operation.

A chilled meat emulsion is emptied into hopper 22 which may have a capacity of approximately 1000 lbs. Fitting 61 is connected to a source of vacuum which is maintained between 27.5 inches to 30 inches HG. Flow valve 59 is adjusted for the desired rate, and the vacuum applied to chamber 24 draws the meat emulsion through conduit 56 and valve 59 into the top of chamber 24 aided by atmospheric pressure acting on the meat in hopper 22. The meat falls by gravity to the bottom of chamber 24 with the vacuum removing the air therefrom in an upward direction. Removal of the air eliminates air pockets or voids thereby improving the appearance and consistency of the finished product. Of course, oxidation of the meat is prevented to reduce spoilage loss. The meat gradually builds up a head in vacuum chamber 24 and also rapidly fills pumping chamber 25 by passing through opening 77 in the top cover thereof. The operator by actuation of the suitable valve for hydraulic cylinder 90 reciprocates same which via piston 84 pumps the meat in pumping chambr 25 through openings 96 in converger assembly 94 into stuffer 29 past check valves 100. Check valves 100 prevent the return of meat as piston 84 is removed to the retracted position. At some point, piston 84 is held in the retracted position and the operator actuates a suitable valve to send motive fluid, which may be air, to move piston 111 to move the food from stuffer 29 out elbows 104 to a suitable tubing not shown. During the vacuumizing process, the operator, by looking through transparent plastic cover 60 can observe the level of meat and adjust valve 59 and the pumping action of cylinder 90 accordingly. By observing piston rod 112 in stuffer 29, the determination when to eject the meat from stuffer 29 can also be made. Thus the entire apparatus can be operated manually if desired.

Applicants by providing the conical type vacuum chamber 24 with its downwardly diverging wall in conjunction with the rectangular pumping chamber have found that the tendency of the chilled meat to form an "arc" or "bridge" over the pumping piston has been greatly alleviated, thereby reducing the need to stop the vacuumizing process to disassemble the apparatus. Further, the rectangular pumping chamber fills at a more rapid rate than the comparably sized circular chamber of old. This is more important in an automated apparatus.

After the vacuumizing has been done, the apparatus is quickly dissembled by pulling up the latch assembly to the position shown in FIG. 8, and moving all of the assemblies toward end 31 of base assembly 21. Each assembly is now accessible for cleaning as is pumping chamber 25 upon the sliding of end plate 86 therefrom. As shown in FIG. 4, vacuum chamber 24 can also be tilted for cleaning by rotating about pin 65.

Although only the basic elements of the device have been described since their particular configuration consitutes this invention, the entire apparatus can be connected with suitable controls which will provide an entirely automatic although conventional operation. In an automatic system, the apparatus is operated manually (substantially as described above) until the apparatus is filled with sufficient meat so that sensors and automatic devices can take over and maintain constant flow of the product. For example use of a meat level electrical probe in vacuum chamber 24 in conjunction with solenoid valves and a compressed air supply, valve 59 can be actuated to maintain the meat level in chamber 24 within suitable limits. Also cylinder 90 can be operated by a suitable electrical control to pump meat into stuffer 29 until a certain back pressure is reached wherein the pumping stops, the piston is with drawn to a rear rest position and the stuffer piston actuated to pump out the meat wherein the pumping action proceeds. Loss of vacuum will cause valve 59 to close and the automatic system to stop. Also other measures are included to prevent operation in case of hydraulic or air pressure failure.

Having thus described the invention it will be apparent to those skill in the art that various changes and modifications can be made without departure from the spirit of the invention or the scope of the appended claims.

We claim:

1. In a vacuumizing apparatus, which is adapted to remove air from a meat emulsion, of the type comprising: a hopper for storing the meat emulsion, a vacuum chamber adapted to be connected to a source of vacuum, a conduit connecting said chamber and hopper, valve means in said conduit for controlling the meat flow to the vacuum chamber, a pumping chamber connected to said vacuum chamber, a stuffer connected to said pumping chamber with a check valve assembly therebetween and means for moving the meat pumped into the stuffer out of said stuffer, wherein the improvement comprises: said vacuum chamber having an annular, downwardly diverging wall and said pumping chamber having a generally rectangular configuration located transverse to and below said vacuum chamber for receiving meat from same, and a rectangular piston which is adapted to be connected to a source of power, mounted for reciprocation in said pumping chamber.

2. The apparatus of claim 1 in which said vacuum chamber is in the form of a frustrum of a cone.

3. The apparatus of claim 2 further comprising sealing means between said vacuum chamber and said pumping chamber.

4. The apparatus of claim 3 further comprising a base therefor, a pair of spaced guide rods rigidly mounted on said base and a source of power for said piston which is a hydraulic cylinder.

5. The apparatus of claim 4 in which said pumping chamber is removably mounted on said rods, and further comprising means for preventing movement of said pumping chamber on said rods.

6. The apparatus of claim 5 in which said stuffer and check valve assembly are movably mounted on said rods, and further comprising a toggle link latch mounted on said base and adapted to move said stuffer and said check valve assembly toward said pumping chamber.

7. The apparatus of claim 6 in which said vacuum chamber is pivotally mounted on said pumping chamber and further comprising latch means for latching said vacuum chamber to said pumping chamber.

8. The apparatus of claim 7 in which the side of said pumping chamber adjacent said rectangular piston's source of power is movably mounted on said rods and is adapted to be latched to said pumping chamber.

9. The apparatus of claim 8 further comprising quick disconnect means for disconnecting and connecting said conduit to said hopper and to said vacuum chamber.

10. The apparatus of claim 9 in which said vacuum chamber has a clear plastic top for view of the meat in the chamber.

\* \* \* \* \*